United States Patent
Rabe

(10) Patent No.: US 12,111,276 B2
(45) Date of Patent: Oct. 8, 2024

(54) ELECTRICAL SYSTEM AND METHOD FOR DETERMINING A POTENTIAL FUNCTIONAL IMPAIRMENT IN THE ELECTRICAL SYSTEM

(71) Applicant: Siemens Energy Global GmbH & Co. KG, Munich (DE)

(72) Inventor: Thomas Rabe, Weinstadt (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 388 days.

(21) Appl. No.: 17/762,145

(22) PCT Filed: Aug. 20, 2020

(86) PCT No.: PCT/EP2020/073283
§ 371 (c)(1),
(2) Date: Aug. 10, 2022

(87) PCT Pub. No.: WO2021/052701
PCT Pub. Date: Mar. 25, 2021

(65) Prior Publication Data
US 2023/0324320 A1    Oct. 12, 2023

(30) Foreign Application Priority Data
Sep. 20, 2019 (DE) ...................... 10 2019 214 342.3

(51) Int. Cl.
*G01N 27/04* (2006.01)
(52) U.S. Cl.
CPC .................................. *G01N 27/04* (2013.01)

(58) Field of Classification Search
CPC .... G01N 27/04; G01N 15/0656; G01N 15/06; G01N 15/0606; G01N 2015/0046;
(Continued)

(56) References Cited

U.S. PATENT DOCUMENTS

| 2008/0190173 A1* | 8/2008 | Wienand | G01N 15/0656 |
| | | | 422/68.1 |
| 2011/0314899 A1* | 12/2011 | Di Miro | G01N 15/0606 |
| | | | 73/23.33 |

(Continued)

FOREIGN PATENT DOCUMENTS

| DE | 10357664 A1 | 7/2005 |
| DE | 102006042508 A1 | 3/2008 |

(Continued)

*Primary Examiner* — Alvaro E Fortich
(74) *Attorney, Agent, or Firm* — Laurance A. Greenberg; Werner H. Stemer; Ralph E. Locher

(57) ABSTRACT

An electrical system has a system housing and electrical components in the housing. At least two conductors of at least one of the electrical components are electrically insulated from one another by an electrical insulator. A sensor system is configured to detect a deposit of an electrically conductive foreign matter layer on the electrical insulator. The sensor system has a measuring surface arranged within the system housing on which at least two spaced-apart electrodes are arranged. The sensor system has a measurement circuit which is configured to measure a parameter which depends on a current flowing between the at least two electrodes. There is also described a method for determining a potential functional impairment in the electrical system.

16 Claims, 3 Drawing Sheets

(58) Field of Classification Search
CPC ...... G01N 27/00; G01N 27/048; G01N 35/00; G01N 13/04; G01N 27/041; G01N 27/12; G01N 27/121; G01N 27/125; G01N 27/126; G01N 27/22; G01N 27/223; G01N 33/0037; G01N 33/004; G01N 33/0044; G01N 33/0054; G01N 33/24; G01N 33/246; G01N 33/442; G01N 33/00; G01N 33/0078; G01N 33/008; G01N 33/0081; G01N 33/0083; G01N 33/0085; G01N 33/0096

See application file for complete search history.

(56) References Cited

U.S. PATENT DOCUMENTS

| | | | |
|---|---|---|---|
| 2014/0166635 A1 | 6/2014 | Andrae | |
| 2014/0192451 A1* | 7/2014 | Locker | H02H 1/0023 |
| | | | 361/103 |
| 2015/0301093 A1* | 10/2015 | Reibke | G01R 27/025 |
| | | | 324/691 |
| 2017/0146441 A1* | 5/2017 | Roesch | F01N 11/007 |
| 2020/0018679 A1 | 1/2020 | Koike et al. | |

FOREIGN PATENT DOCUMENTS

| | | |
|---|---|---|
| DE | 102009035296 A1 | 2/2011 |
| DE | 102011106632 A1 | 12/2012 |
| DE | 102014204883 A1 | 9/2015 |
| DE | 112017005165 T5 | 7/2019 |

\* cited by examiner

ELECTRICAL SYSTEM AND METHOD FOR DETERMINING A POTENTIAL FUNCTIONAL IMPAIRMENT IN THE ELECTRICAL SYSTEM

SPECIFICATION

FIELD AND BACKGROUND OF THE INVENTION

The invention relates to an electrical system having a system housing and electrical components, wherein the electrical components are arranged in the system housing, and at least two conductors of at least one of the electrical components are electrically insulated from one another by means of an electrical insulator. The invention also relates to a method for determining a potential functional impairment in the electrical system.

In such electrical systems, there is the problem that a deposit of electrically conductive impurities may result in a functional impairment in the electrical system. The electrically conductive impurities may be, for example, dust, in particular metallic dusts or soot, ash, fiber dust and the like, as well as moisture. Furthermore, the result may be a combination of deposited dusts and moisture. In this case, the moisture may appear, for example, as a result of mist, in particular sea mist, or dew. In this case, electrically non-conductive dusts also become electrically conductive and electrically conductive dusts become even more conductive since the electrical resistance of such an impurity layer is reduced. Such impurities may pass through ventilation grilles of the system housing, for example, and may be deposited on the electrical components and the electrical insulator of the electrical system inside the system housing.

A deposit of the electrically conductive impurities on that surface of the electrical insulator on which an electrically conductive impurity layer can form is problematic, in particular. A current from two conductors of one or more components of the electrical system, which conductors are electrically insulated from one another by means of the electrical insulator, can flow along the electrically conductive impurity layer. The electrically conductive impurity layer becomes critical when it becomes moist as a result of condensation of moist air or other introduction of moisture. Along a current path of a current between the conductors and through the moist electrically conductive impurity layer, local heating of the moist electrically conductive impurity layer occurs over time, as a result of which a region of the moist electrically conductive impurity layer dries out. If the dry region is large enough to interrupt the flowing current, a voltage drop across the dry region occurs. Finally, with sufficient voltage, the result is an arc across the dry region, culminating in an electrical flashover.

The electrical flashover may result in a short circuit of the electrical system. A short circuit may result in undesirable interruptions in the operation of the electrical system, in particular as a result of tripping of an electrical fuse of the electrical system. The cause of the short circuit must be investigated with a high outlay. Furthermore, a short circuit may result in damage to the electrical system, in particular the electrical insulator.

DE 10 2009 035 296 A1 discloses an electrical switching arrangement having a housing, which switching arrangement has a detection device which determines the formation of a material layer in a detection range of the detection device inside the housing. The detection device is designed with means for optically detecting foreign layers.

It is desirable to provide reliable and precise detection of electrically conductive impurity layers in an electrical system at low cost in order to detect potential functional impairments in the electrical system.

SUMMARY OF THE INVENTION

The object of the invention is therefore to provide an electrical system in which potential functional impairments on account of electrically conductive foreign layers are detected reliably, precisely and at low cost.

The above object is achieved by means of the subjects of the patent claims, in particular by means of an electrical system as claimed and a method as claimed. Further advantages and details of the invention emerge from the subclaims, the description and the drawings. In this case, it goes without saying that features and details disclosed in connection with the system according to the invention also apply in connection with the method according to the invention, and so reciprocal reference is or can always be made in respect of the disclosure pertaining to the individual aspects of the invention.

According to a first aspect, the stated object is achieved by means of an electrical system having a system housing and electrical components, wherein the electrical components are arranged in the system housing, and at least two conductors of at least one of the electrical components are electrically insulated from one another by means of an electrical insulator, wherein the electrical system has a sensor system which is designed to detect a deposit of an electrically conductive impurity layer on the electrical insulator, wherein the sensor system has a measuring surface which is arranged inside the system housing and on which at least two electrodes spaced apart from one another are arranged, and the sensor system has a measuring circuit which is designed to measure a parameter which depends on the current flowing between the at least two electrodes.

In other words, the parameter is a measure of the electrical conductivity of the foreign layer between the at least two electrodes. The parameter may be a current intensity, for example. A voltage of the measuring circuit may be predefined for this purpose.

Accordingly, the electrical system can detect a potential functional impairment by means of an electrically conductive impurity layer which is deposited on the measuring surface. In this case, a functional impairment may be, for example, a short circuit of the electrical system. A functional impairment may therefore result in the unscheduled downtime of the electrical system. The measuring surface arranged in the system housing and the measuring circuit of the sensor system are used to measure a deposit of an electrically conductive impurity layer on the measuring surface in a very reliable, precise and cost-effective manner.

The fact that at least two conductors of at least one of the electrical components are electrically insulated from one another by means of an electrical insulator may mean that the at least two conductors are of the same electrical component. However, it may also mean that the at least two conductors are of different electrical components. This is because the deposit of electrically conductive impurity layers may result in short circuits both between conductors of the same electrical components and between conductors of different electrical components. Furthermore, a plurality of electrical insulators may be arranged between the conductors of the electrical components. The electrical system can fundamentally be used to detect a potential functional impairment irrespective of one of the above-mentioned configurations. Furthermore, the invention makes it possible to detect a potential functional impairment in good time by means of a current flow from a conductor to ground.

The measuring surface may be arranged and formed in the electrical system in such a manner that the electrically conductive impurity layer on the electrical insulator or a plurality of electrical insulators between conductors is detected only indirectly and/or only partially directly by means of the measuring surface. Indirectly means that the measuring surface does not itself measure the electrically conductive impurity layer on the electrical insulator(s), but rather measures an electrically conductive impurity layer which is deposited on the measuring surface. For this purpose, the measuring surface may be arranged at a distance from the electrical insulator(s). On the basis of the deposit on the measuring surface, it can be estimated with a high degree of certainty whether and the extent to which an electrically conductive impurity layer has formed on the electrical insulator(s). Alternatively or additionally, the measuring surface may be arranged on the surface of the electrical insulator or a plurality of measuring surfaces may be arranged on surfaces of a plurality of electrical insulators. This makes it possible to directly detect the electrically conductive impurity layer.

The at least two electrodes are preferably in the form of conductor tracks. This makes it possible to easily cover a large measuring surface by means of the at least two electrodes in order to obtain reliable results from the sensor system.

Furthermore, at least one of the at least two conductor tracks preferably runs in a comb-shaped manner. In this case, a comb shape is formed, in particular, by at least one outer conductor track and inner conductor tracks which are arranged on the outer conductor track, are spaced apart from one another and leave the outer conductor track transversely, in particular perpendicularly. In particular, two conductor tracks may be comb-shaped and may be interleaved in one another. In this case, the inner conductor tracks may be alternately arranged beside one another, in particular parallel to one another.

Furthermore, the at least two conductor tracks are preferably interleaved in one another. In this case, the conductor tracks may be arranged beside one another, in particular parallel to one another. For example, a plurality of conductor tracks may be interleaved in a comb-shaped conductor track. In this case, the plurality of conductor tracks run beside, and in particular parallel to, inner conductor tracks of the comb-shaped conductor track.

The at least two electrodes are preferably connected in a current-conducting manner to an AC voltage source. The measuring circuit may have this AC voltage source. In principle, the at least two electrodes may be connected in a current-conducting manner to a voltage source, for example also a DC voltage source, which the measuring circuit may have. However, an AC voltage source has the advantage over a DC voltage source that there is no electrolytic corrosion at the electrodes. This makes it possible to increase a maintenance freedom and service life of the sensor system.

Furthermore, the measuring surface is preferably arranged at and/or on the electrical insulator. As a result, part of the electrically conductive impurity layer on the electrical insulator can be measured directly, thus making it possible to obtain particularly accurate measurement results.

In addition, the measuring surface is preferably arranged horizontally or substantially horizontally inside the system housing. In this case, horizontal means an arrangement perpendicular to the direction of the force of gravity. Substantially horizontal means that deviations from a horizontal arrangement of up to 20° are possible. In other words, it can also be stated that the measuring surface is arranged parallel or substantially parallel to a base surface. The base surface may be, for example, that of the system housing used to set down or install the electrical system on a base or may be, for example, that of the base on which the electrical system is set down or installed. On account of the impurities which are deposited by the force of gravity, the largest possible deposit of electrically conductive impurity layer can be measured by virtue of the horizontal arrangement of the measuring surface.

The measuring surface may be arranged, in particular, parallel or substantially parallel to a surface of the electrical insulator. In this case, substantially parallel means that deviations from a parallel arrangement of up to 20° are possible. This makes it possible to ensure that the measuring surface has an orientation which is as similar as possible in the system housing relative to the electrical insulator, with the result that the electrically conductive impurity layer on the measuring surface corresponds, with a high degree of probability, to the electrically conductive impurity layer on the surface of the electrical insulator, for example with in terms of dust composition, layer thickness and moisture, on account of the air circulation prevailing in the system housing. This is because, depending on the orientation in which the measuring surface is arranged relative to the surface of the electrical insulator or the surfaces of the electrical insulators and the location at which the measuring surface is arranged relative to ventilation slots, ventilation ducts or ventilation grilles and the system housing, the impurity layer deposited thereon can have a different form.

It is preferred for a carrier of the measuring surface, on which the at least two electrodes are arranged, to have the same insulating material as the electrical insulator. In particular, the carrier or a carrier material of the measuring surface is composed of the same insulating material as the electrical insulator. Since impurities adhere to different materials to different extents, it can thereby be ensured that, by measuring the electrically conductive impurity layer deposited on the measuring surface, the electrically conductive impurity layer on the electrical insulator is detected as precisely as possible.

Moreover, it is preferred for the sensor system to have a heating apparatus for heating the measuring surface. Since the electrical components and therefore the electrical insulator(s) usually heat up more than the measuring surface during operation, there is condensation of moist air on the measuring surface even before condensation occurs on the electrical insulator(s). As a result, there is the risk of a potential functional impairment being incorrectly detected by the sensor system even though a condensate which would cause or increase the conductivity of an impurity layer has not formed on the electrical insulator(s). It is therefore possible to use the heating apparatus to avoid such incorrect detection by heating the measuring surface.

Furthermore, it is preferred for the electrical system to have a temperature sensor for sensing a temperature of the electrical system and a control apparatus which is connected to the temperature sensor and to the heating apparatus and is designed to control the temperature of the measuring surface according to the temperature of the electrical system. The temperature of the electrical system may be, for example, an internal temperature in the system housing. The temperature sensor may accordingly be an air temperature sensor in the system housing. Furthermore, the temperature of the electrical system may be the temperature measured at one or more electrical components or at one or more electrical insulators. The temperature sensor may accordingly be arranged at the one or more electrical components or at the one or more electrical insulators. In particular, the sensor system may also have the temperature sensor. In addition, a combination of a plurality of temperature sensors at different locations in the system housing, for example at different electrical components and electrical insulators, is possible. In this case, a temperature value derived from the temperatures measured by the plurality of temperature sensors, for example a mean value, can be used as the temperature of the electrical system. The fact that the control apparatus is designed to control the temperature of the measuring surface according to the temperature of the electrical system may mean controlling the temperature of the measuring surface to the temperature of the electrical system.

However, the control apparatus is preferably designed to control the temperature of the measuring surface to a temperature below the temperature of the electrical system, thus resulting in a temperature difference between the temperature of the measuring surface and the temperature of the electrical system. This temperature difference may be a predefined temperature difference. The predefined temperature difference may be an absolute temperature difference or a percentage temperature difference which is determined as a percentage on the basis of the temperature of the electrical system. The temperature difference may be, for example, in a range of 1° C. to 5° C., in particular 2° C. to 4° C. As a result, a potential functional impairment in the electrical system owing to condensation on an impurity layer that is not conductive in the dry state or on an electrically conductive impurity layer can be determined by means of the sensor system even before such a functional impairment occurs. As a result, it is then possible to also take suitable measures to avoid the functional impairment.

It is also preferred for an evaluation unit to be connected to the measuring circuit and for the evaluation unit to be designed to compare the measured parameter of the current flowing between the at least two electrodes with a threshold value and to output a report of a potential functional impairment in the electrical system if the measured parameter has exceeded the threshold value. The threshold value may be a predefined threshold value which is still below the parameter which would ensure a functional impairment, for example a short circuit. The electrical system, in particular the sensor system, may have the evaluation unit. It is also possible for the sensor system to have a wireless communication device which is configured to communicate wirelessly with the evaluation unit. Accordingly, the evaluation unit may be arranged, for example, in a central computer which can monitor a plurality of electrical systems for potential functional impairments. The report may be output optically on a screen of the evaluation unit or of the electrical system and/or acoustically, for example. The report may also be a control-related report in the form of an instruction to the electrical system. For example, the instruction may involve adjusting the operation of the electrical system, reducing an operating load of the electrical system or increasing a speed of one or more fans of the electrical system.

It is also preferred for the electrical system to be a transformer. The transformer may be, for example, a power transformer, a distribution transformer or the like. The transformer may be, in particular, a dry-type transformer, very particularly a cast resin transformer. Unlike oil-filled transformers, they are particularly sensitive to contamination. Transformers are used in different environments and may be exposed in this case to very low temperatures, very high temperatures, temperature fluctuations, weather conditions, moist air, salty air or to air which is otherwise contaminated with dusts, for example, which can sustain or cause a functional impairment. Alternatively, the electrical system may be, for example, a converter, a switchgear installation or a switching device.

According to a second aspect, the stated object is achieved by means of a method for determining a potential functional impairment in an electrical system as claimed in one of the preceding claims, wherein the method has the steps of: measuring a parameter of a current between the at least two electrodes, comparing the measured parameter with a threshold value, and outputting a report of a potential functional impairment in the electrical system if the measured parameter exceeds the threshold value.

The method preferably also has the steps of: determining an increase in the parameter between measuring times of the measuring operation, and calculating a threshold time at which the parameter will likely exceed the threshold value on the basis of the increase in the parameter. In other words, an increase in the parameter over time is used to predict the likely threshold time. As a result, necessary maintenance times, at which the electrical system must be cleaned, can be stipulated in a more economical manner, for example.

Furthermore, the method may preferably have the steps of: sensing a temperature of the electrical system, and controlling a temperature of the measuring surface according to the temperature of the electrical system. In particular, the temperature of the measuring surface can be controlled to the temperature below the temperature of the electrical system, thus resulting in the temperature difference between the temperature of the measuring surface and the temperature of the electrical system.

Further measures which improve the invention emerge from the following description of various exemplary embodiments of the invention which are schematically illustrated in the figures. All features and/or advantages, including design details and spatial arrangements, emerging from the claims, the description or the figures may be essential to the invention both separately and in the various combinations.

The invention is explained in more detail below on the basis of the accompanying drawings, in which:

DETAILED DESCRIPTION OF THE INVENTION

Elements with the same function and method of operation are each provided with the same reference signs in FIGS. 1 to 4.

Figure 1:
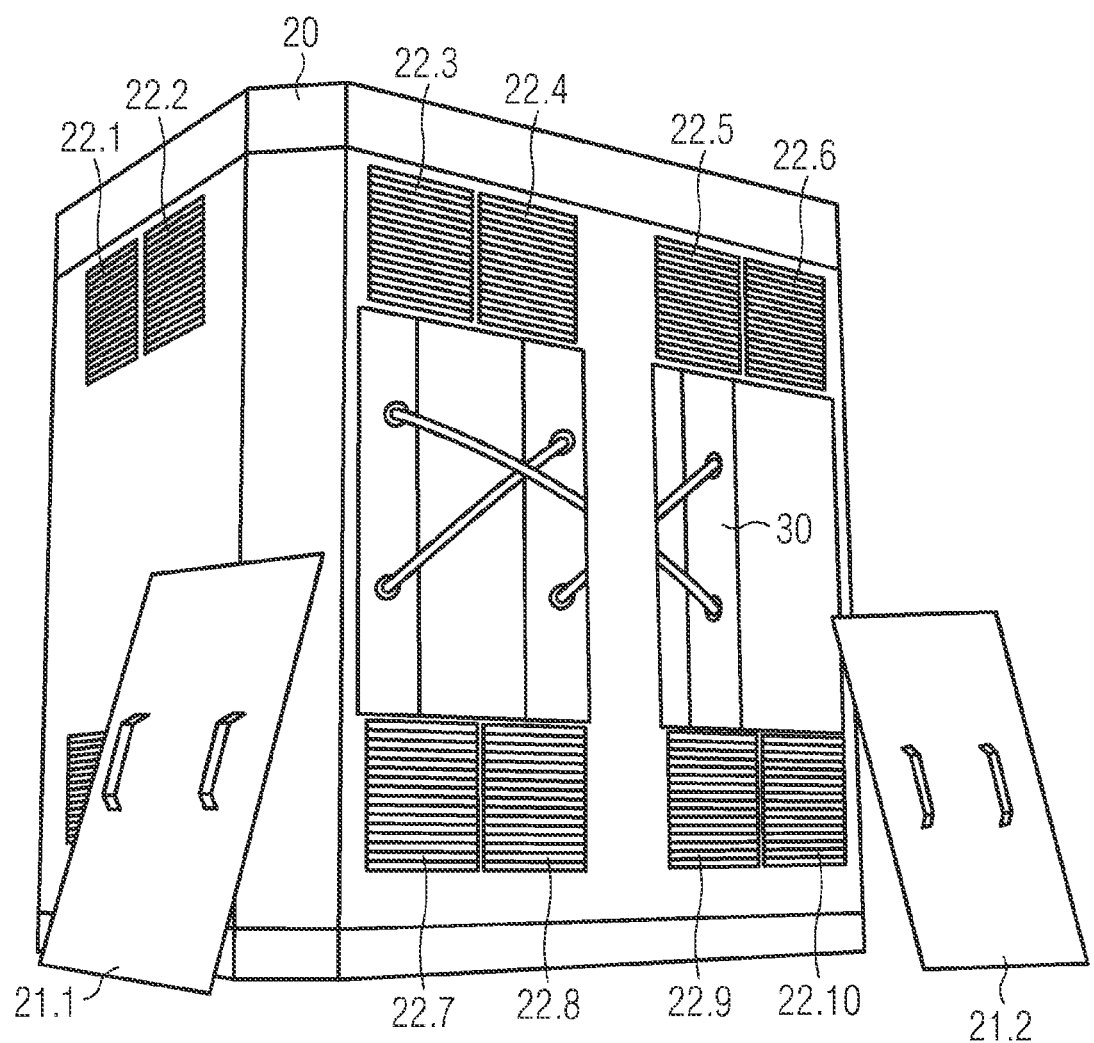
FIG. 1 shows a perspective side view of an exemplary embodiment of an electrical system according to the invention having a system housing.

FIG. 1 shows a perspective side view of an exemplary embodiment of an electrical system 30 according to the invention having a system housing 20. In the present exemplary embodiment, the electrical system 30 is in the form of a transformer, in particular a cast resin transformer.

The electrical system 30 is surrounded by the housing 20. The housing 20 is shown here with doors 21 removed and therefore in an open state which allows a view of the electrical system 30. The housing 20 is used, inter alia, to protect from external weather influences and the deposition of impurities on the electrical system 30. In order to make it possible to ventilate the electrical system 30, a multiplicity of ventilation grilles 22.1, 22.2, 22.3, 22.4, 22.5, 22.6, 22.7, 22.8, 22.9, 22.10 are arranged in the housing 20. Despite the housing 20, moist air, salty air and at least small quantities of electrically conductive and electrically non-conductive impurities can reach the electrical system 30 through the ventilation grilles 22.1, 22.2, 22.3, 22.4, 22.5, 22.6, 22.7, 22.8, 22.9, 22.10.

Figure 2:
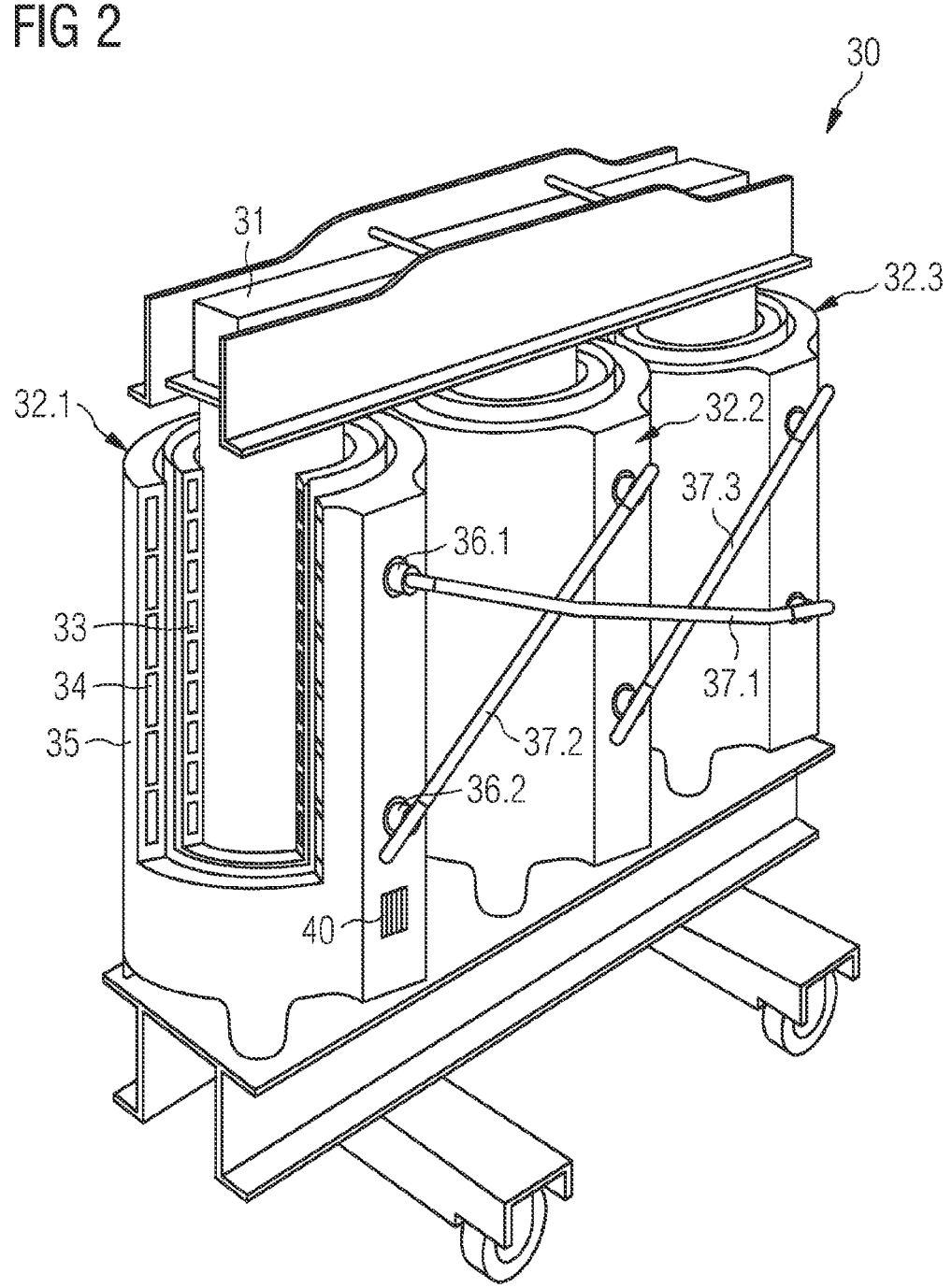
FIG. 2 shows a perspective side view of the electrical system from FIG. 1 without the system housing.

FIG. 2 shows a perspective side view of the electrical system 30 from FIG. 1 without the system housing 20. The electrical system 30 has a plurality of electrical components, of which a first electrical component 31, a second electrical component 33 and a third electrical component 34 are designated. In the present exemplary embodiment of the cast resin transformer, the first electrical component 31 is a three-limb core, the second electrical component 33 is a low-voltage winding and the third electrical component 34 is a high-voltage winding. The second electrical component 33 and the third electrical component 34 are part of a component arrangement 32.1 which is a coil arrangement here. Component arrangements 32.2, 32.3 of identical construction and in the form of coil arrangements are arranged on other limbs of the first electrical component 31. The electrical components 31, 33, 34 are electrically insulated from one another, but only one electrical insulator 35 is designated. The electrical insulator 35 is arranged around the third electrical component 34 and insulates two first conductors 36.1, 36.2 of the third electrical component 34 from one another. In the present case, the first conductors 36.1, 36.2 are in the form of electrical connections of two second conductors 37.1, 37.2 of the conductors 37.1, 37.2, 37.3 in the form of busbars. In the present exemplary embodiment, the electrical insulator 35 is based on epoxy resin.

A measuring surface 42 of a sensor system 40 is arranged on the electrical insulator 35. Alternatively, the measuring surface 42 can also be arranged at another location in the system housing 20, for example on the system housing 20 or in another region or on another component of the electrical system 30, for example on the first electrical component 31. Furthermore, the measuring surface 42 may not be arranged parallel to a surface of the electrical insulator 35, as shown, but rather may be arranged perpendicular thereto, that is to say, in particular, horizontally in the system housing 20. A deposit of an electrically conductive impurity layer on the electrical insulator 35 can be detected using the sensor system 40. In this case, an electrically conductive impurity layer between the first conductors 36.1, 36.2 may be critical, for example, since it can result in a short circuit in the event of an electrical flashover.

Figure 3:
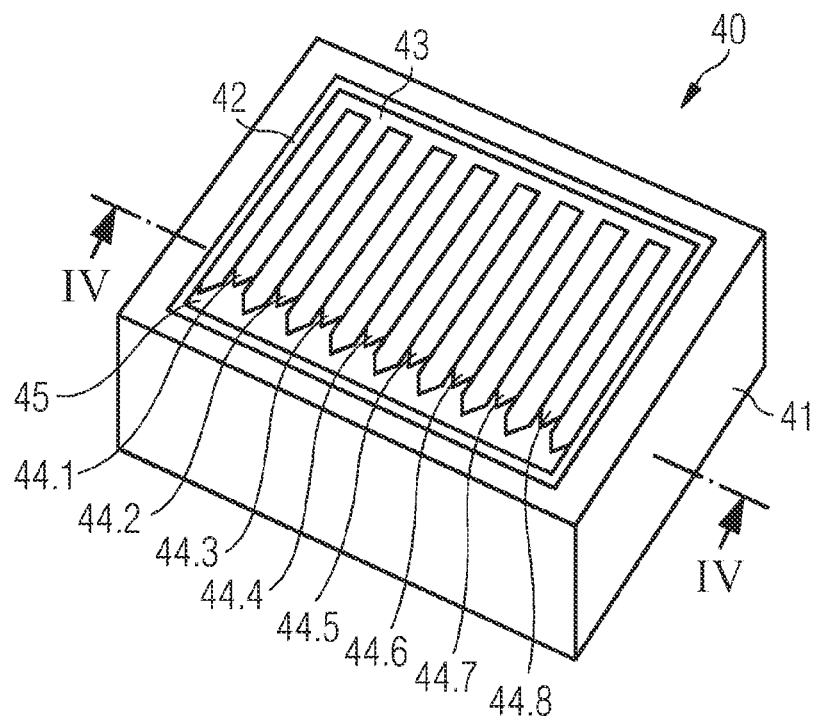
FIG. 3 shows a perspective side view of a sensor system of the electrical system from FIG. 2.

FIG. 3 shows a perspective side view of the sensor system 40 of the electrical system 30 from FIG. 2. The sensor system 40 has a sensor housing 41 and the measuring surface 42 arranged thereon. The measuring surface 42 is formed by a carrier 45 which, in the present case, is formed from the same material as the electrical insulator 35 so that the measuring surface 42 has the same adhesion properties for impurities as the electrical insulator 35. A first electrode 43 which is in the form of a conductor track and is comb-shaped is arranged on the carrier 45. Further conductor tracks 44.1, 44.2, 44.3, 44.4, 44.5, 44.6, 44.7, 44.8 of a second electrode 44 are also arranged on the carrier 45 and are interleaved with the first electrode 43. The first electrode 43 and the conductor tracks 44.1, 44.2, 44.3, 44.4, 44.5, 44.6, 44.7, 44.8 of the second electrode 44 are spaced apart from one another.

Figure 4:
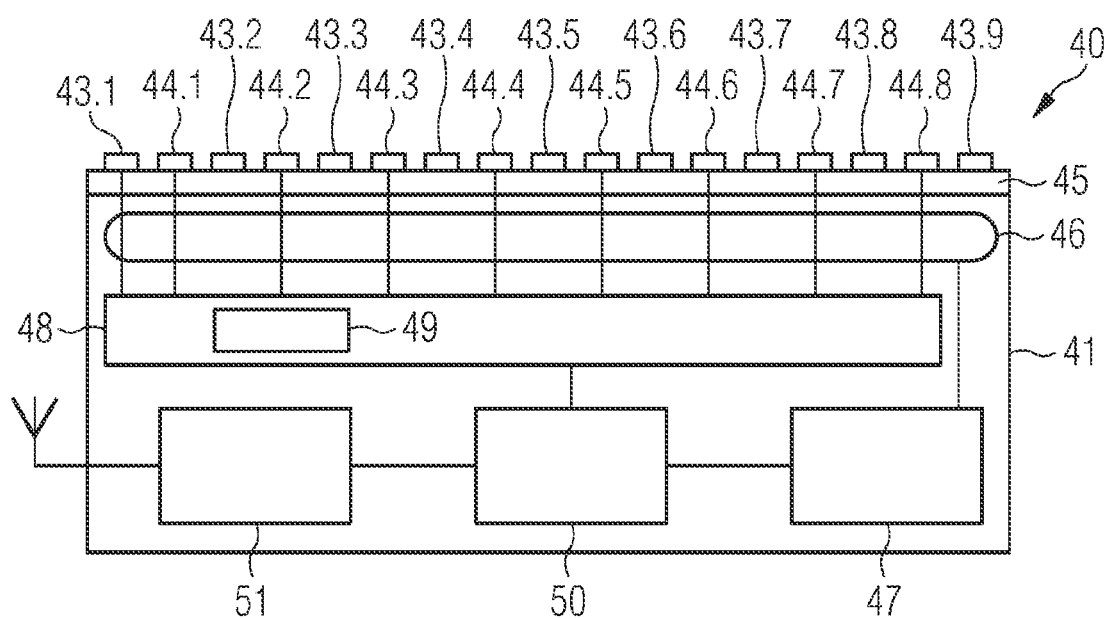
FIG. 4 shows a view along a section through the sensor system from FIG. 3.

FIG. 4 shows a view of a section along the line X-X through the sensor system 40 from FIG. 3. It can be seen here that the sensor system 40 also has a heating apparatus 46, a control apparatus 47 connected to the heating apparatus 46, a measuring circuit 48 which is connected to the first electrode 43 and to the conductor tracks 44.1, 44.2, 44.3, 44.4, 44.5, 44.6, 44.7, 44.8 of the second electrode 44 and has a voltage source 49, and an evaluation unit 50 and a wireless communication device 51.

In the present exemplary embodiment, the current source 49 is in the form of an AC voltage source and outputs current with AC voltage to the first electrode 43 and the second electrode 44. In this case, on account of the alternating distance between the conductor tracks 43.1, 43.2, 43.3, 43.4, 43.5, 43.6, 43.7, 43.8, 43.9 of the first electrode 43 and the conductor tracks 44.1, 44.2, 44.3, 44.4, 44.5, 44.6, 44.7, 44.8 of the second electrode 44, only a small current or no current is transmitted between them if there is no electrically conductive impurity layer on the measuring surface 42, in particular between the conductor tracks 43.1, 43.2, 43.3, 43.4, 43.5, 43.6, 43.7, 43.8, 43.9 of the first electrode 43 and the conductor tracks 44.1, 44.2, 44.3, 44.4, 44.5, 44.6, 44.7, 44.8 of the second electrode 44. If, however, an electrically conductive impurity layer is deposited on the measuring surface 42, a current or a change in the current is measured by the measuring circuit 48. A parameter of the current, for example a current intensity, which is measured by the measuring circuit 49 provides information on the conductivity of the electrically conductive impurity layer and therefore on the risk of a functional impairment in the electrical system on account of a short circuit.

The evaluation unit 50 is connected to the measuring circuit 48 and evaluates the measured parameter, here the current intensity. The evaluation unit compares the measured current intensity with a predefined threshold value and uses the wireless communication device 51 connected to the evaluation unit 50 to output a report of a potential functional impairment in the electrical system to a central computer (not shown) of the electrical system 30 if the measured current intensity has exceeded the threshold value. As a result, measures for preventing the functional impairment can be initiated by the central computer.

So that a potential functional impairment is detected even before the functional impairment, the control apparatus 47 controls heating of the measuring surface 42 by means of the heating apparatus 46, which may be in the form of a heating coil in the present case for example, in such a manner that the temperature of the measuring surface 42 is below the temperature of the electrical system 30, thus resulting in a temperature difference between the temperature of the measuring surface 42 and the temperature of the electrical system 30. As a result, a potential functional impairment can be detected on account of condensation on the measuring surface 42 before condensation on the electrical insulator 35, and therefore the functional impairment, occurs, with the result that countermeasures to prevent the functional impairment can still be taken in good time.

The invention claimed is:

1. An electrical system, comprising:
   a system housing;
   electrical components disposed in said system housing;

an electrical insulator disposed to electrically insulate at least two conductors of at least one of said electrical components from one another;

a sensor system configured to detect a deposit of an electrically conductive impurity layer on said electrical insulator, said sensor system having a measuring surface arranged inside said system housing and at least two electrodes spaced apart from one another on said measuring surface; and a measuring circuit of said sensor system configured to measure a parameter which depends on a current flowing between said at least two electrodes.

2. The electrical system according to claim 1, wherein said at least two electrodes are conductor tracks.

3. The electrical system according to claim 2, wherein at least one of said at least two conductor tracks runs in a comb-shaped pattern.

4. The electrical system according to claim 2, wherein said at least two conductor tracks are interleaved in one another.

5. The electrical system according to claim 1, wherein said at least two electrodes are connected in a current-conducting manner to an AC voltage source.

6. The electrical system according to claim 1, wherein said measuring surface is arranged on said electrical insulator.

7. The electrical system according to claim 1, wherein said measuring surface is arranged in vicinity of said electrical insulator.

8. The electrical system according to claim 1, wherein said measuring surface is arranged horizontally or substantially horizontally inside said system housing.

9. The electrical system according to claim 1, wherein said measuring surface is formed on a carrier and said at least two electrodes are arranged on said carrier, and wherein said carrier and said electrical insulator are formed of the same insulating material.

10. The electrical system according to claim 1, wherein said sensor system includes a heater for heating said measuring surface.

11. The electrical system according to claim 10, further comprising a temperature sensor for sensing a temperature of the electrical system and a control apparatus connected to said temperature sensor and to said heating apparatus, and wherein said control apparatus is configured to control a temperature of the measuring surface according to the temperature of the electrical system.

12. The electrical system according to claim 11, wherein said control apparatus is configured to set the temperature of said measuring surface to a temperature below the temperature of the electrical system, thus resulting in a temperature difference between the temperature of the measuring surface and the temperature of the electrical system.

13. The electrical system according to claim 1, further comprising an evaluation unit connected to said measuring circuit and configured to compare the measured parameter of the current flowing between said at least two electrodes with a threshold value and, when the measured parameter has exceeded the threshold value, to output a report of a potential functional impairment in the electrical system.

14. The electrical system according to claim 1, wherein the electrical system is a transformer.

15. A method of determining a potential functional impairment in the electrical system according to claim 1, the method comprising:

measuring a parameter of a current between the at least two electrodes of the electrical system;

comparing the parameter as measured with a threshold value; and outputting a report of a potential functional impairment in the electrical system if the measured parameter exceeds the threshold value.

16. The method according to claim 15, which further comprises the steps of:

determining an increase in the parameter between different measuring times of a measuring operation; and calculating a threshold time at which the parameter will likely exceed the threshold value on the basis of the increase in the parameter.

* * * * *